United States Patent [19]

Miau et al.

[11] Patent Number: 5,170,671
[45] Date of Patent: Dec. 15, 1992

[54] DISK-TYPE VORTEX FLOWMETER AND METHOD FOR MEASURING FLOW RATE USING DISK-TYPE VORTEX SHEDDER

[75] Inventors: Jiun-Jih Miau, Tainan; Tzu-Wen Liu, Taichung; Jung-Hua Chou, Shinchu; Tzu-Liang Chen, Tainan, all of Taiwan

[73] Assignee: National Science Council, Taiwan

[21] Appl. No.: 758,676

[22] Filed: Sep. 12, 1991

[51] Int. Cl.$^5$ ............................................. G01F 1/32
[52] U.S. Cl. .................................................. 73/861.22
[58] Field of Search ............ 73/861.52, 861.22, 861.24, 73/861.21

[56] References Cited

U.S. PATENT DOCUMENTS 4,638,672 1/1987 McCall ............................ 73/861.52

FOREIGN PATENT DOCUMENTS 2928568 1/1981 Fed. Rep. of Germany ... 73/861.21

Primary Examiner—Herbert Goldstein
Attorney, Agent, or Firm—Marks & Murase

[57] ABSTRACT

An axisymmetric bluff body is proposed for a vortex flowmeter as the vortex shedder. It is found that vortex shedding frequencies measured can be nondimensionalized into a linear relation with the Reynolds number for area blockage ratios of circular disks up to 29.2%. Vortex shedding frequency can be clearly sensed by a pressure transducer installed on the pipe wall in the neighborhood of the maximum pressure fluctuation being measured. This suggests a feasible design that the sensor of a vortex flowmeter can be removed from the flow field or changed easily.

6 Claims, 10 Drawing Sheets

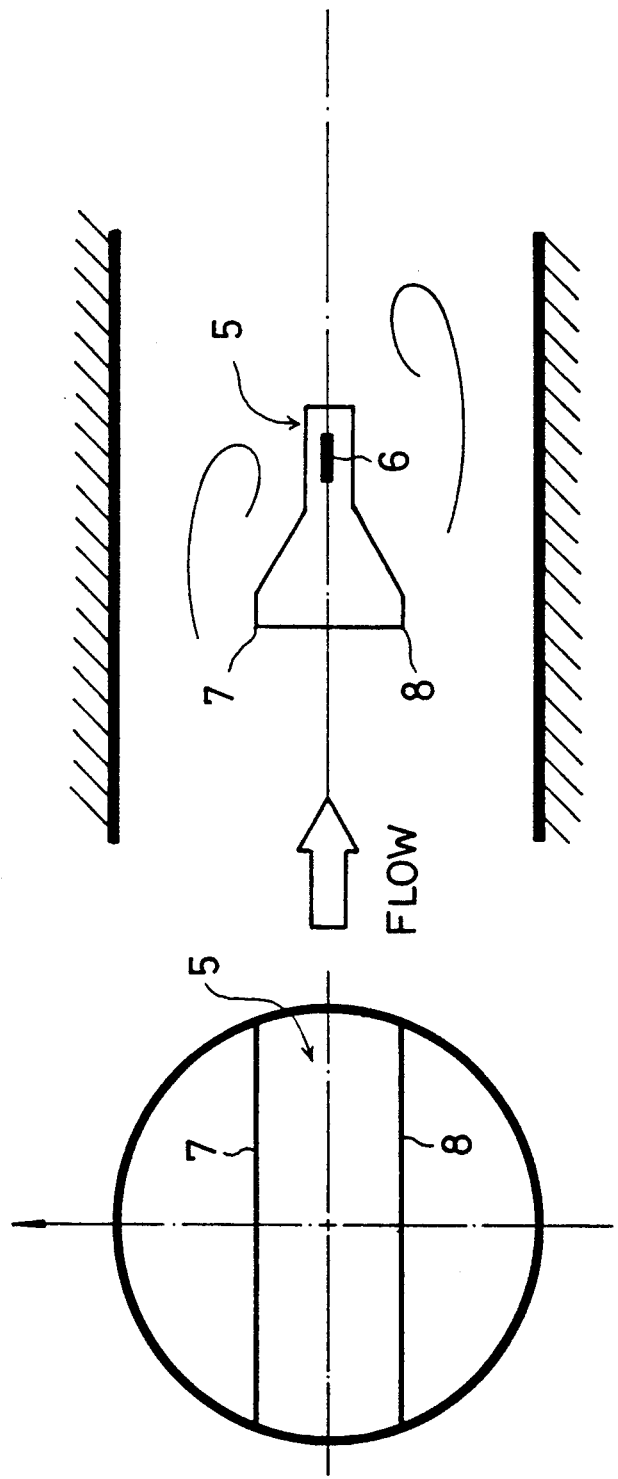

DISK-TYPE VORTEX FLOWMETER AND METHOD FOR MEASURING FLOW RATE USING DISK-TYPE VORTEX SHEDDER

BACKGROUND OF THE INVENTION

1. Technical Field of the Invention

The present invention relates to a flowmeter for detecting flow rate in a pipe or a tube. The present invention relates more particularly to a vortex flowmeter.

2. Description of Related Art

Since flow rate is an primary variable in fluid dynamics, how to measure flow rate in a pipe or a tunnel, which is called an inner flow, becomes important in scientific researches and industrial applications.

Plural methods can be used to measure the flow rate in different conditions. As a most simple example, in a fully developed laminar pipe flow, we can easily get the measurement of flow rate after we had determined the velocity at a point and the location of this point and the diameter of the pipe. Besides, several commercially available flowmeters are briefly discussed below.

Orifice meters have been by far the most popular for years. The principle behind orifice meters is that, a differential pressure transmitter measures pressure drop across a restriction in the line. The restriction is usually a concentric orifice, with the orifice diameter being 10% to 75% of the inside pipe diameter. The pressure drop can be measured with flange taps. The simplified equation, $$F = C P$$

where $F$ = volumetric flow rate, $P$ = differential-pressure measurement, and $C$ orifice coefficient, represents the relations between flow rate and pressure difference.

The orifice meter provides a time-proven and relatively low-cost approach for measuring most flows. But, the orifice meter does have its limitations, in that under certain situations, for various reasons, it will not work. For liquid service, these cases include systems where: the necessary pressure drop in not available (in most gravity-flow applications); the fluid will flash at the reduced pressure that occurs in the throat of the orifice meter; or flow rate is high.

About the orifice meter, since flow is related to the square root of the pressure drop, it requires a square-root extractor between the output of the differential pressure transmitter and a flow controller in order to give a linear relationship, which is at the sacrifice of cost and accuracy.

Other differential pressure type meters include: venturi meter, flow nozzle, annular orifice gentile tube, wedge meter, integral orifice, pitot tube, elbow meter, variable area meter, target meter, sonic nozzle, multiport pitot, dall tube, variable aperture meter, etc.

Positive displacement meters operated by using mechanical divisions to successively displace discrete volumes of fluid. This principle of operation is essentially simple, but the accuracy depends upon precision in both manufacture and assembly.

A common used positive displacement meter is the rotary piston meter. This employs a cylindrical piston which is displaced around a cylindrical chamber by the flowing liquid. Rotation of the piston drives an output shaft which is used to operate counters. Rotary piston meters can handle a wide range of process liquids with a large range of viscosity.

Other positive displacement type meters include: reciprocating piston, sliding vane, nutating disc, oval gear, helix meter, bi- and tri-rotors, metering pump, roots blower, diaphragm meter, wet gas meter, bellows meter, etc.

The principle of operation of inferential type meters uses a rotating component (wheel, vane, rotor or helical runner) to convert free stream energy into rotary motion. This rotary motion is then detected by some type of pick-up device, i.e. magnetic, optical, radio frequency, or gears and a mechanical counter. Axial turbines are the most widely available and accurate type of inferential type meters.

Vortex shedding meter is the most commonly used among fluid oscillatory type meters. A vortex flowmeter detects frequency of vortex shedding from a bluff body which, as learned from fluid dynamics, is linearly proportional to the fluid velocity under certain conditions. Relevant papers discussing this phenomenon can be found in: H. V. Mangin, Tappi 58, 65 (1975); D. J. Lomax, Control Instrument 7, 36 (1975); and T. J. S. Brain and R. W. W Scott, J. Phys. E 15, 967 (1982).

Conventional vortex flowmeter is a two dimensional bluff body accommodating a pressure sensor or a probe for detecting vortex shedding frequencies. The bluff body is across the flow field with its front face facing the stream as shown in FIG. 1A and 1B. The upper edge and lower edge of the front face form sharp angles with the front face. As fluid flows under certain conditions, vortices alternatively develop behind both edges of the bluff body. The shedding frequency is defined as the number of vortices developed in a certain time. Since shedding frequency is linearly proportional to the flow speed, flow speed can be easily evaluated. The accuracy of vortex flowmeter is relatively high in a wide range of flow speed. The turndown ratio, which is the maximum measurable flow rate over the minimum measurable flow rate, is up to 100 to 1, at an accuracy of 0.5% of meter reading.

The vortex flowmeter has been well accepted as a competitor for accurate and inexpensive flow rate measurement. Current vortex flowmeters are designed with a two-dimensional-like bluff body together with a sensor that is either integrated into the bluff body or separately situated downstream for detecting the vortex shedding frequency, as described in M. Takamoto and K. Komiya, J. Fluid Control 11, 27 (1979), and P. G. Scott, "Use of Vortex Flowmeters for Gas Measurements," J. Petroleum Technol. 33, 2082 (1981).

It is considered that the maintenance and replacement of pressure sensor is not quite easy. Pressure sensor could not be detached from the bluff body unless the pipe is disconnected. This is due to the limitation of the design of two dimensional bluff body because pressure sensor must be placed behind the bluff body. In an experiment, one can not know whether the probe works precisely or not. Even he (she) knows the error arises from the probe, changing the probe may change the structure of flow field.

Other types of flowmeters not described above includes: electromagnetic meters, ultrasonic meters, mass meters, thermal meters, miscellaneous meters, solids meters, open channel meters, etc.

SUMMARY OF THE INVENTION

It is therefore an object of this invention to provide a vortex flowmeter that is easy to service the probe or sensor.

This object of the present invention are fulfilled by providing an axisymmetric bluff body with a sharp edge for the vortex flowmeter, and a pressure sensor installed on the pipe wall. The pressure fluctuations of vortices, at the same frequency of vortex shedding frequency, can be sensed by the pressure sensor.

The present study considers a practical application that an axisymmetric bluff body could be placed in a circular pipe as a vortex shedder, then the resultant wake affects flow near the wall to behave unsteadily. This unsteady characteristic is then picked up by a pressure sensor installed on the wall. And then, the vortex shedding frequencies of the wake were correlated with the Reynolds numbers of the flow. The present invention further provides a nondimensionalization scheme that considered the blockage effect of the circular disk and would correlate the reduced frequencies with the Reynolds numbers linearly, for area blockage ratios up to 29.2%. The area blockage ratio BR was defined as $d^2/D^2$, where d and D were the diameters of the circular disk and the circular pipe, respectively. Detecting vortex shedding frequency from wall pressure fluctuations was feasible if the measured location was chosen properly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1A is a front view of a conventional two dimensional bluff body installed in a pipe;

FIG. 1B is a cross-sectional side view of a conventional two dimensional bluff body installed in a pipe;

DETAILED DESCRIPTION OF THE EMBODIMENTS

Figure 2B:
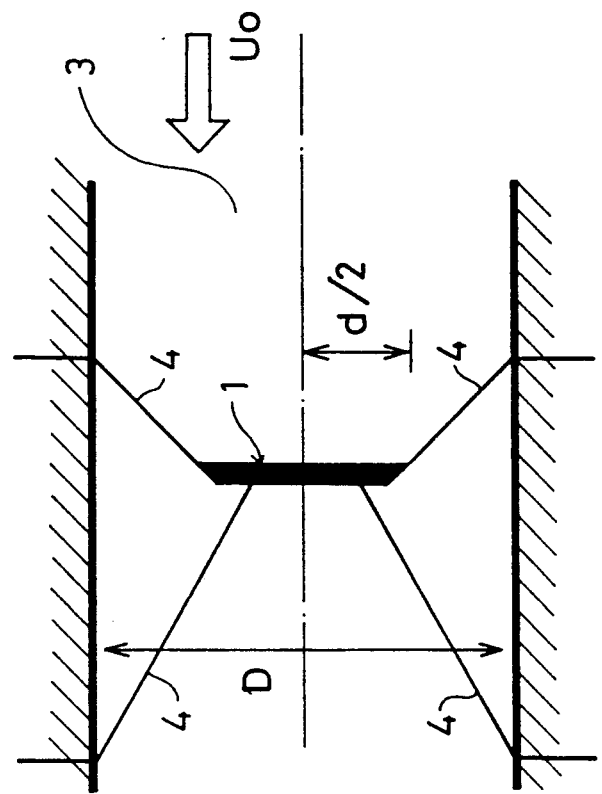
FIG. 2B is a cross-sectional side view of a disk-type bluff body according to the present invention installed in a pipe, including a pressure sensor, spectral analyzer and filter.
Figure 2A:
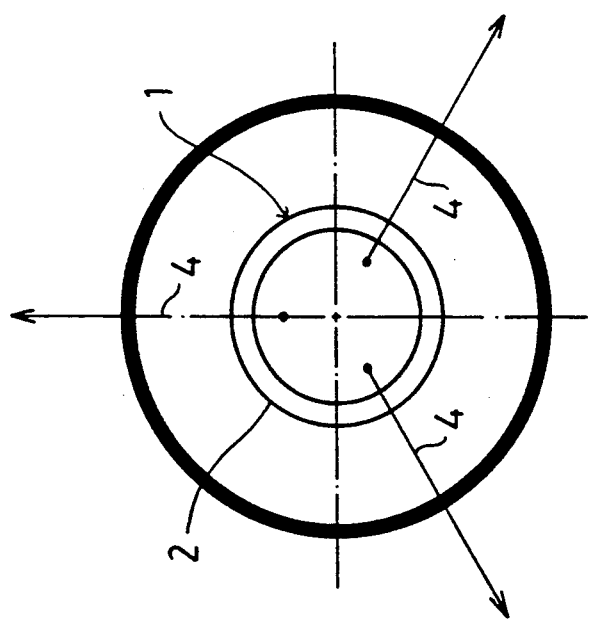
FIG. 2A is a front view of a disk-type bluff body according to the present invention installed in a pipe.

The present invention utilizes a circular disk to be a vortex shedder. The circular disk 1, as shown in FIG. 2A and 2B, has a sharp edge 2 which is bevelled. Circular disk 1 is fixed at the center of tunnel 3 by wires 4, with its larger side facing the fluid flow. The effects of this kind of vortex shedder are discussed below in some experiments, which is an excerpt from the inventor's paper, "Vortex flowmeter designed with wall pressure measurement", J. J. Miau, and T. W. Liu, Rev. Sci. Instrum. Vol. 61, p.2676 (1990).

EXPERIMENTS ON THE PRESENT INVENTION

Experiments were carried out in a low-speed closed-return water tunnel. The test section is circular in cross section, D=148 mm, and is 800 mm long. The velocity in the test section can be controlled in a range of 1-60 cm/s. At the inlet of test section, the turbulence intensity normalized by the mean velocity measured at the core of the inlet, $U_o$ is about 0.9%.

A Venturi flowmeter providing a reference of flow rate is installed downstream of the pump. The bulk velocity deduced from the flowmeter is found to be very close to $U_o$. This signifies that flow enters the test section is uniform with a thin boundary layer. A survey of the mean velocity profile at the inlet of the test section using a laser velocimeter indicates that the boundary-layer thickness is less than 7 mm, while the velocity distribution outside the boundary layer is uniform.

In this study, vortex-shedding phenomenon necessary for flow rate measurement was produced by a circular disk situated in the test section, see FIGS. 2A and 2B. This circular disk was held normal to the flow direction by six stainless-steel wires of 0.2 mm in diameter. Under the maximum operating $U_o$ condition, the Reynolds number based on the diameter of the wires was about 130. Wakes resulting behind the wires were found to be negligible in comparison with the wake behind the circular disk. As seen in FIGS. 2A and 2B, the circular disk has the sharp edge facing the incoming flow which is bevelled at an angle less than 90o This ensures that flow is separated from the circular disk at the edge irrespective of Reynolds numbers. Six sizes of circular disks were employed in this study. Their diameters, denoted as d, are 30, 52, 70, 75, 80, and 88 mm, corresponding to area blockage ratios of 4.1%, 12 3%, 22.3%, 25.6%, 29.2%, and 35.4%, respectively.

A laser velocimeter of two-color and three-beam system, DANTEC LAD10, was employed for obtaining vortex shedding frequency in the wake behind the circular disk. The results provide a reference for wall pressure data to compare with.

Wall pressure distributions in the streamwise direction were obtained with a differential-type pressure transducer, Validyne DP-103. Originally this pressure transducer served for time-mean pressure measurement, because its frequency response is limited below 50 Hz. However, as found in the present flow, frequencies associated with wall pressure fluctuations were normally lower than 10 Hz. Thus this pressure transducer was capable of measuring pressure fluctuations as well.

Laser-Doppler velocity measurements performed in the wake behind the circular disk indicate that regular vortex shedding phenomenon can be found in the cases with circular disks of area blockage ratios below 29.2%. Further, these frequencies measured, denoted as f, can be normalized by d and $U_{max}$ into a unified relation, where $U_{max}$ is the mean streamwise velocity of the flow outside the maximum width of the separation bubble. In the experiment, $U_{max}$ was obtained from the Bernoulli's equation with the time-mean wall pressure at the streamwise location corresponding to the maximum width of the separation bubble behind the circular disk, $U_o$, and the wall pressure at a reference location 26 cm upstream of the circular disk being known (relative discussions can be found in A. M. K. P. Taylor and J. H. Whitelaw, J. Fluid. Mech. 139, 391 in 1984). The data of $St^*$ ($=fd/U_{max}$) of different circular disks are plotted against Reynolds numbers in FIG. 3A, where $Re_d^* = U_{max}d/\gamma$ and $\gamma$ is the kinematic viscosity of water. It is seen that these data points appear to collapse into a single curve. A linear regression of these data points further indicate that this curve can be described by $$St^* = K_1 + K_2 Re_d^* \qquad (1)$$

Figure 3A:
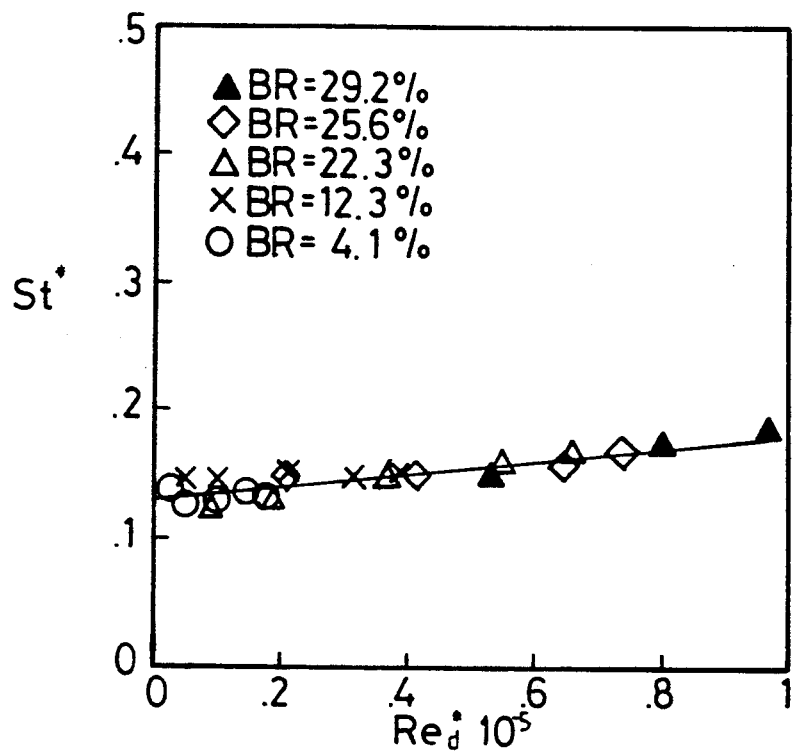
FIG. 3A shows the distributions of St* vs $Re_d^*$ in a range of $2.5 \times 10^3 - 9.7 \times 10^4$.
Figure 3B:
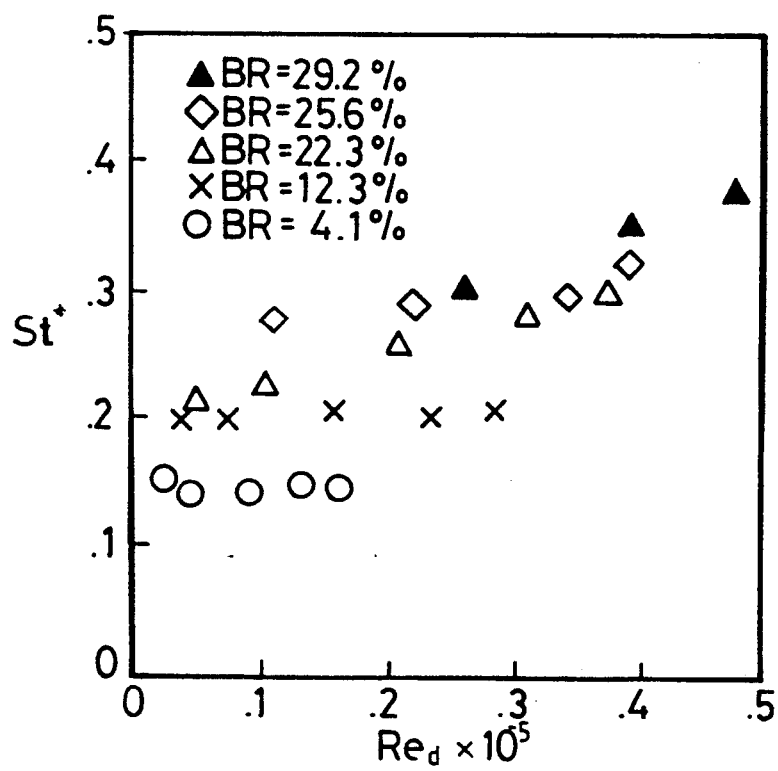
FIG. 3B shows the distributions of St vs $Re_d$ in a range of $2.5 \times 10^3 - 9.7 \times 10^4$.
Figure 4A:
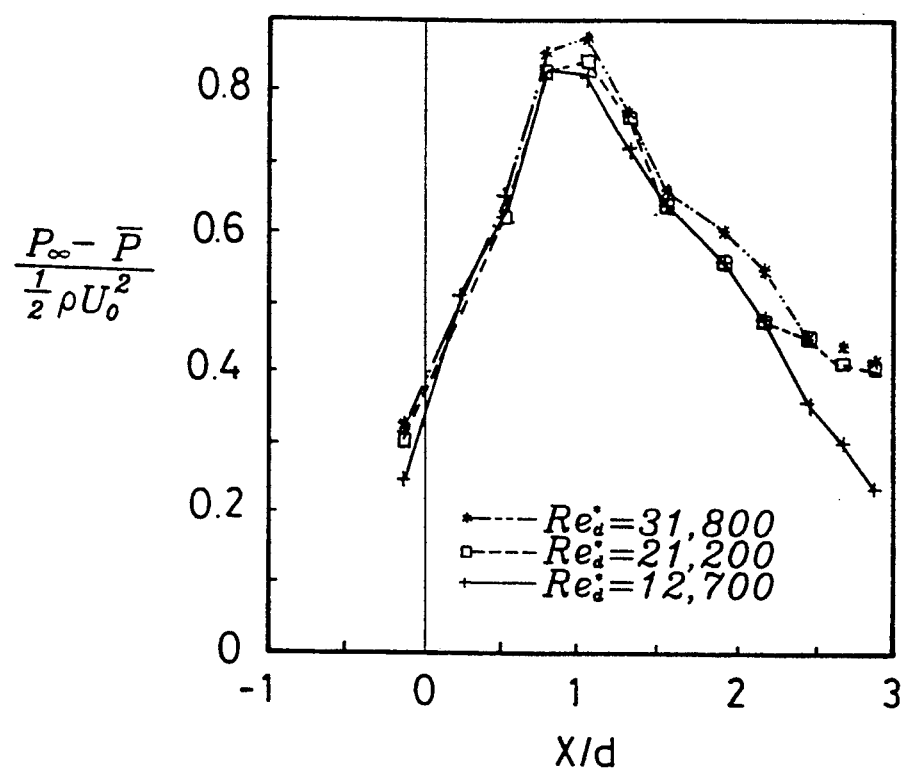
FIG. 4A shows the mean pressure distribution in terms of $P\infty - \bar{P}/\frac{1}{2}\rho U^2 o$, for disk A.
Figure 4B:
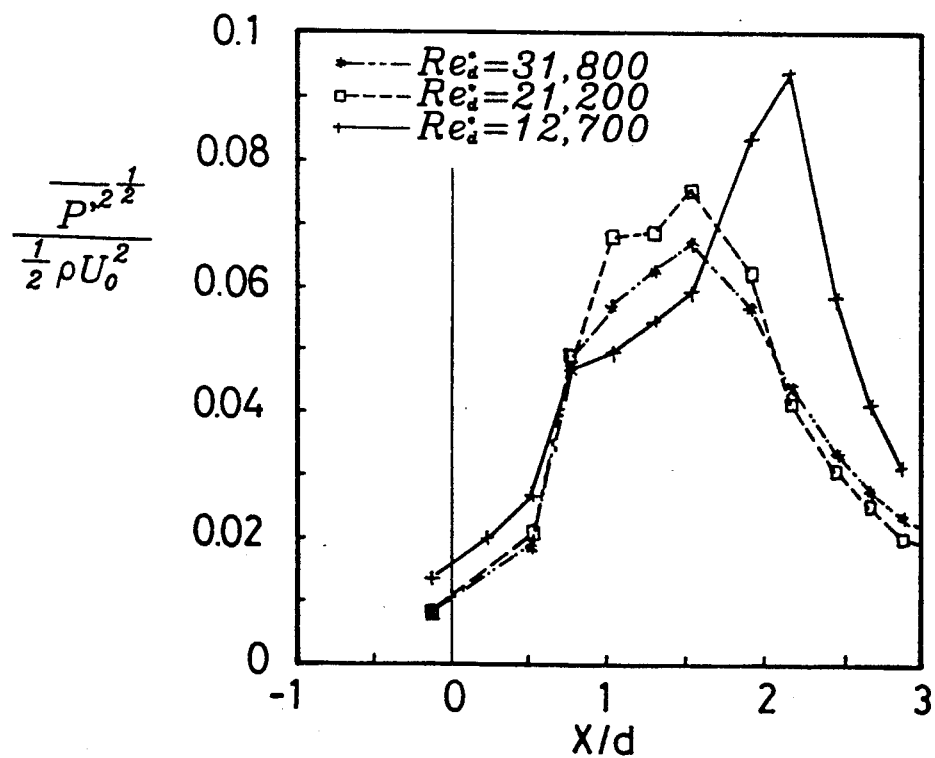
FIG. 4B shows the root-mean-square pressure fluctuation distributions, for disk A.
Figure 4C:
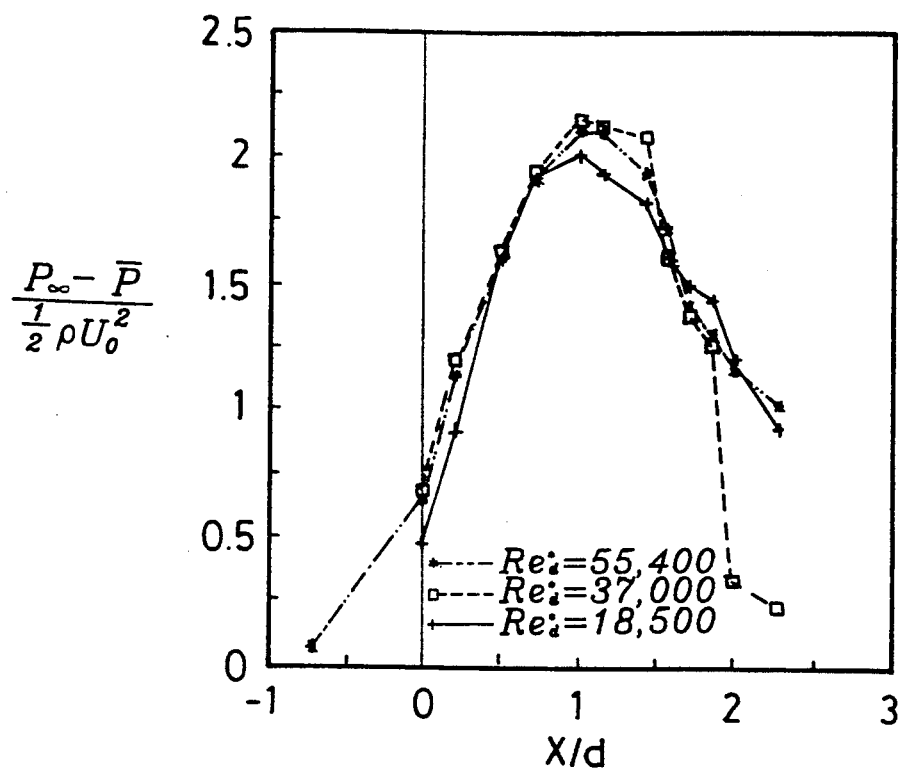
FIG. 4C shows the mean pressure distribution in terms of $P\infty - \bar{P}/\frac{1}{2}\mu U^2 o$, for disk B.
Figure 4D:
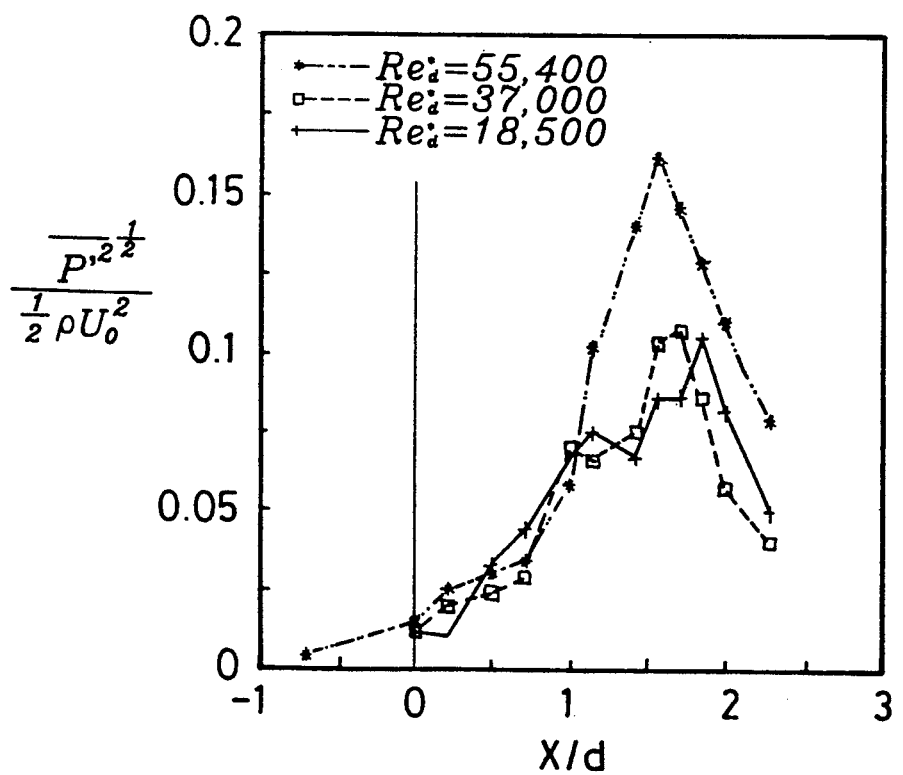
FIG. 4D shows the root-mean-square pressure fluctuation distributions $P'^{2\frac{1}{2}}/\frac{1}{2}\rho U^2 o$, for disk B.

$K_1$ and $K_2$ are the nondimensional coefficients, where $K_1 = 0.130$, $K_2 = 5.20 \times 10^{-7}$. As seen in FIG. 3A, correlations between the data points and the linear curve are quite good, characterized by a correlation coefficient of 0.897. For comparison, FIG. 3B shows the distributions of St versus Re, as the conventional definitions of $St = fd/U_o$ and $Re_d = U_o d/\gamma$ for flow without blockage effect. Apparently, the data points of different blockage ratios scatter in a manner that the values of St increase with the blockage ratios, and it is not meaningful to correlate all the data points with a linear curve. As noted $St^*$ retrieves to St when $U_{max} = U_o$, i.e., the blockage effect is negligible.

$U_{max}$ signifies the aerodynamics blockage effect due to the presence of the circular disk in the circular pipe. Following Lefebvre (A. H. Lefebvre, CoA Report Aero. No. 188 in 1965), $U_{max}$ can also be obtained from the following expression, as a function of $U_o$ and BR:

$$\left(\frac{U_{max}}{U_0}\right)^2 = 1 + 4.4 \frac{BR}{(1-BR)^2}. \qquad (2)$$

A comparison of the values of $U_{max}/U_o$ obtained from (2) and the values of $U_{max}/U_o$ obtained from experiments is given in Table I, which indicates that the discrepancies for all the cases studied are less than 8%. Since the discrepancies appear in a manner that the numerical values resulted from (2) are systematically lower than the experimental data, the expression of (2) could be further modified in improving the prediction of $U_{max}/U_o$.

TABLE I

| Values of $U_{max}/U_o$ obtained from experiment and from Eq. (2). | | | | | | |
|---|---|---|---|---|---|---|
| BR | 4.1% | 12.3% | 22.3% | 25.6% | 29.2% | 35.4% |
| $(U_{max}/U_o)^a$ | 1.11 | 1.36 | 1.76 | 1.88 | 2.03 | 2.30 |
| $(U_{max}/U_o)^b$ | 1.09 | 1.31 | 1.62 | 1.74 | 1.89 | 2.16 |

[a]Experimental values.
[b]Values calculated from Eq. (2).

At present, one may combine the expressions of (1) and (2) into the following form:

$$\frac{fd}{U_0} \cdot \frac{1}{J} = K_1 + K_2(U_0 d/\nu)J, \qquad (3)$$

where $$J = \sqrt{1 + 4.4 \frac{BR}{(1-BR)^2}}. \qquad (4)$$

Therefore, $$AU_0^2 + BU_0 + C = 0, \qquad (5)$$

where $A = K_2 dj^2/\gamma$, $B = K_1 J$, and $C = fd$. Hence, $$U_0 = \frac{-B + \sqrt{B^2 - 4AC}}{2A}, \quad U_0 > 0. \qquad (6)$$

Thus, $U_o$ can be obtained from (6) if f, d, BR, $\gamma$, $K_1$, and $K_2$ are known. Hand calculations with (2) for a case with the circular disk of BR=25.6% and f=1.9 Hz obtained from laser velocimeter measurement give $U_o$ to be 48.4 cm/s. This value is about 7% higher than $U_o = 45.2$ cm/s measured in the flow. This discrepancy is noticed mainly due to the fact that the expression of (2) does not predict the ratio of $(U_o/U_{max})$ accurately enough. For practical use, a calibration procedure to modify the expression of (2) is necessary.

From a practical standpoint, there is no point to design a vortex flowmeter with circular disk whose size is too large to result in unnecessary momentum loss. On the other hand, the circular disk has to be large enough in order that the unsteady characteristic of the wake is reflected from flow development near the wall. On the basis of these considerations, two cases of the circular disks whose area blockage ratios are 12.3% and 22.3%, denoted as disks A and B, respectively, are studied further.

Wall pressure distributions along the streamwise direction obtained for these two cases are shown in FIG. 4A-4D. In this figure, the quantities of mean pressure, in terms of $P_\infty - \overline{P}$, and root-mean-square pressure fluctuation, $\overline{P'^2}$, are normalized by the dynamic pressure, $\frac{1}{2}\rho U_o^2$, where $P_\infty$ is the reference wall pressure measured at 26 cm upstream of the circular disk, $\rho$ is the density of water, and d denotes the streamwise coordinate with X=0 at the frontal face of the circular disk. In this figure it is noted that in each of the cases the maximum root-mean-square pressure fluctuation occurs downstream of the location where the minimum mean pressure or the maximum value of $P_\infty - \overline{P}$ is measured. An earlier work (T. W. Liu, Masters thesis, Institute of Aeronautics and Astronautics, National Cheng-Kung University in 1989) indicates that the location of the minimum wall pressure measured coincides with the location of the maximum width of the separation bubble, while the location of the maximum root-mean-square pressure fluctuation measured signifies the occurrence where the influence of the wake eddies on the boundary layer developed on the wall is the most pronounced.

Figure 5A:
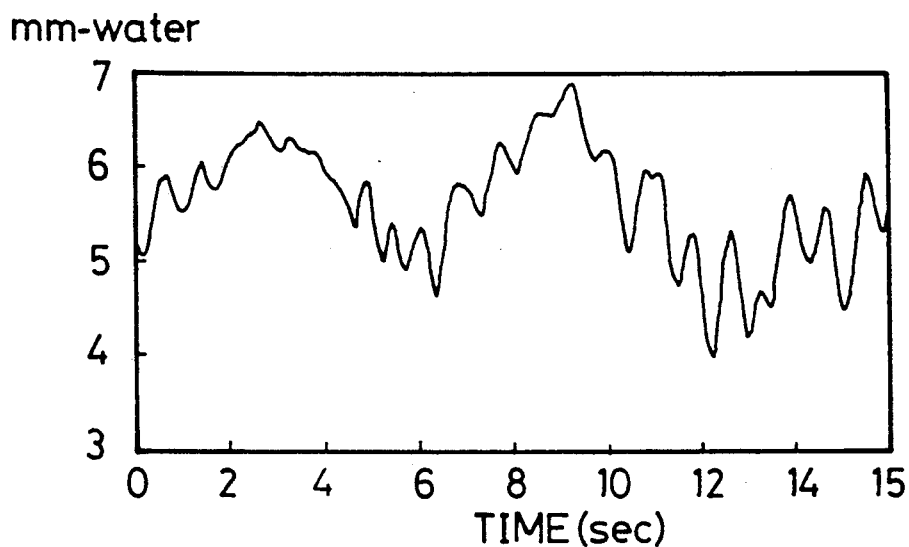
FIG. 5A shows the raw pressure signal obtained for disk B at $X/d=2.14$, $Re_d^* = =3.7 \times 10^4$.
Figure 5B:
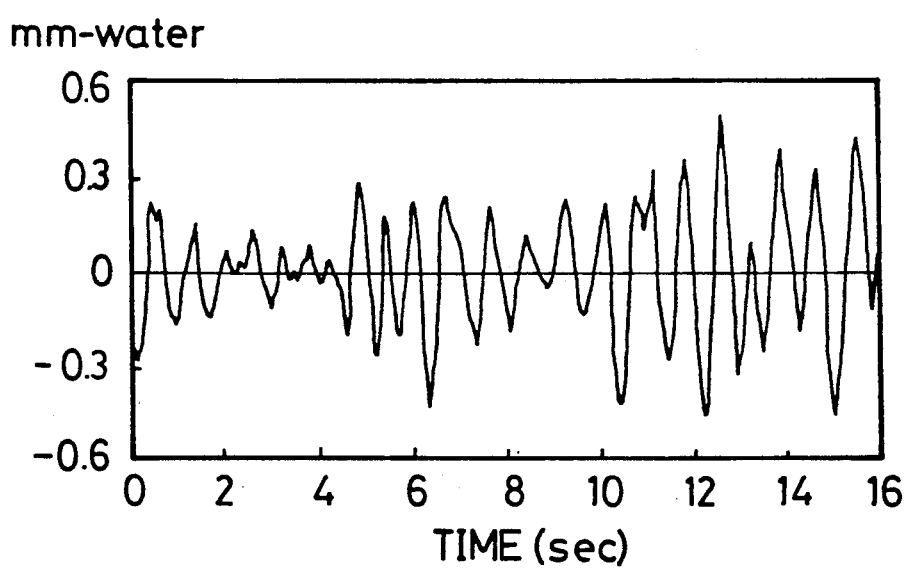
FIG. 5B shows the high-pass variations of the signal trace shown in FIG. 5A.
Figure 6A:
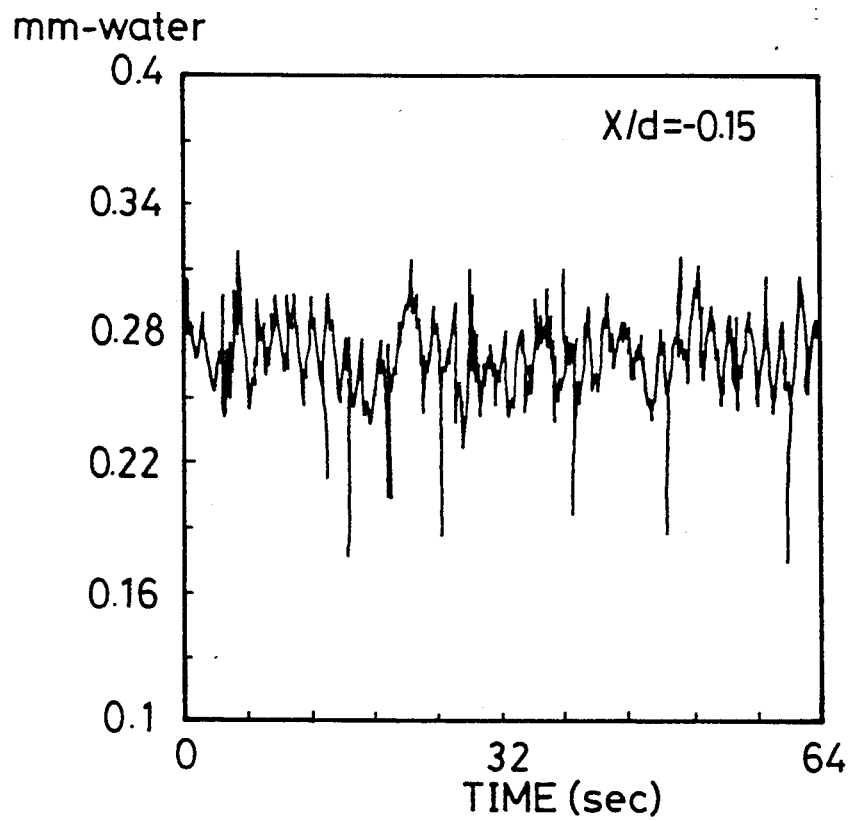
FIG. 6A shows the raw pressure signal obtained for disk A, $Re_d^* = 1.1 \times 10^4$, at $X/d = -0.15$.
Figure 6B:
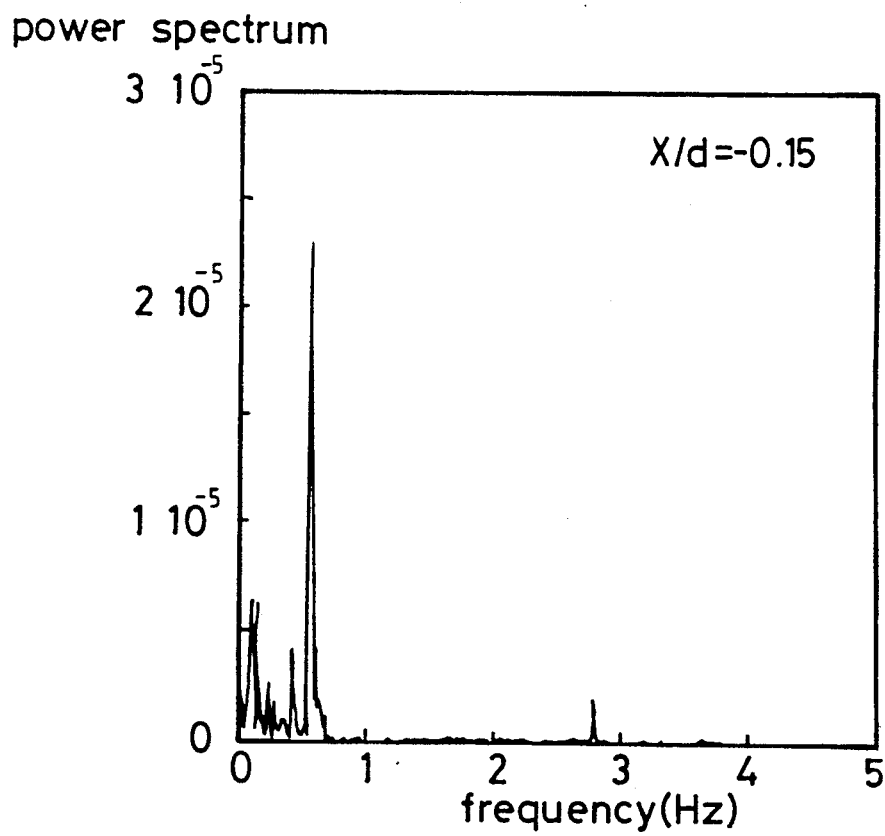
FIG. 6B shows the frequency spectra of wall pressure fluctuation obtained for disk A, $Re_d^* = 1.1 \times 10^4$, at $X/d = -0.15$.
Figure 6C:
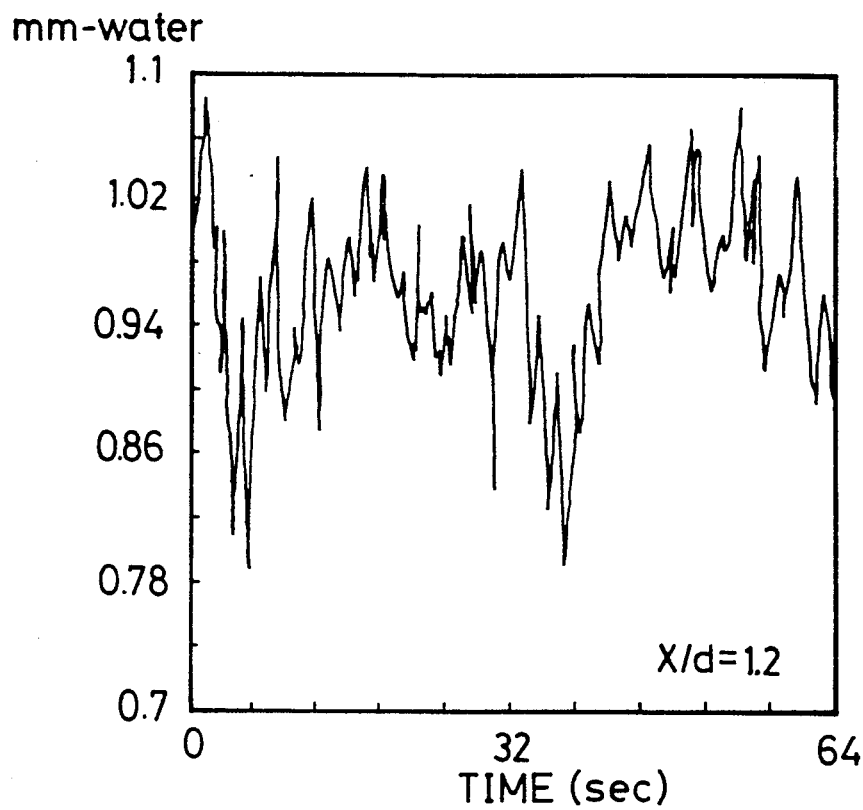
FIG. 6C shows the raw pressure signal obtained for disk A, $Re_d^* = 1.1 \times 10^4$, at $X/d = 1.2$.
Figure 6D:
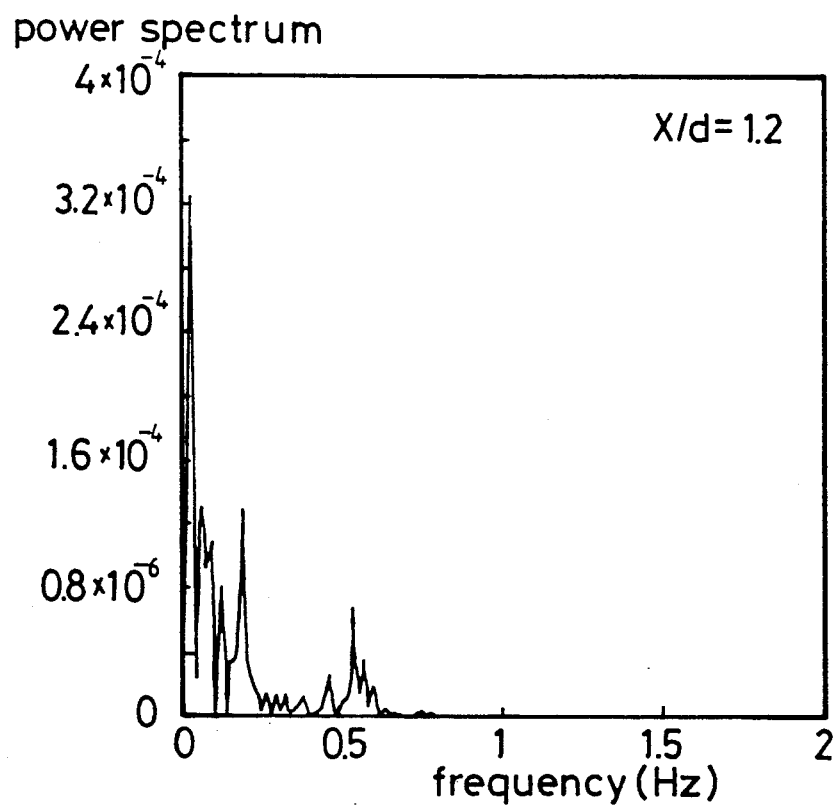
FIG. 6D shows the frequency spectra of wall pressure fluctuation obtained for disk A, $Re_d^* = 1.1 \times 10^4$, at $X/d = 1.2$.
Figure 6E:
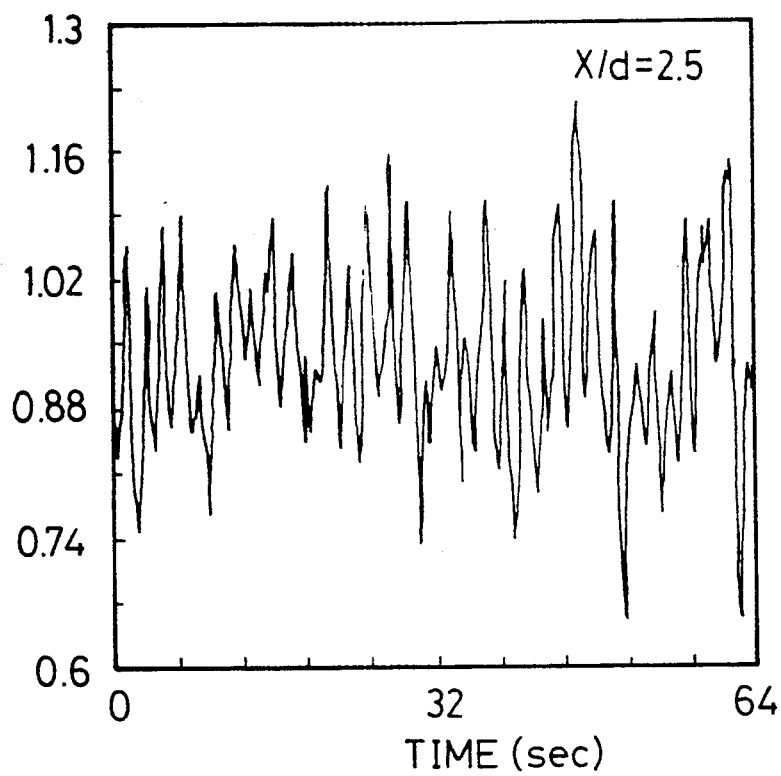
FIG. 6E shows the raw pressure signal obtained for disk A, $Re_d^* = 1.1 \times 10^4$, at $X/d = 2.5$.
Figure 6F:
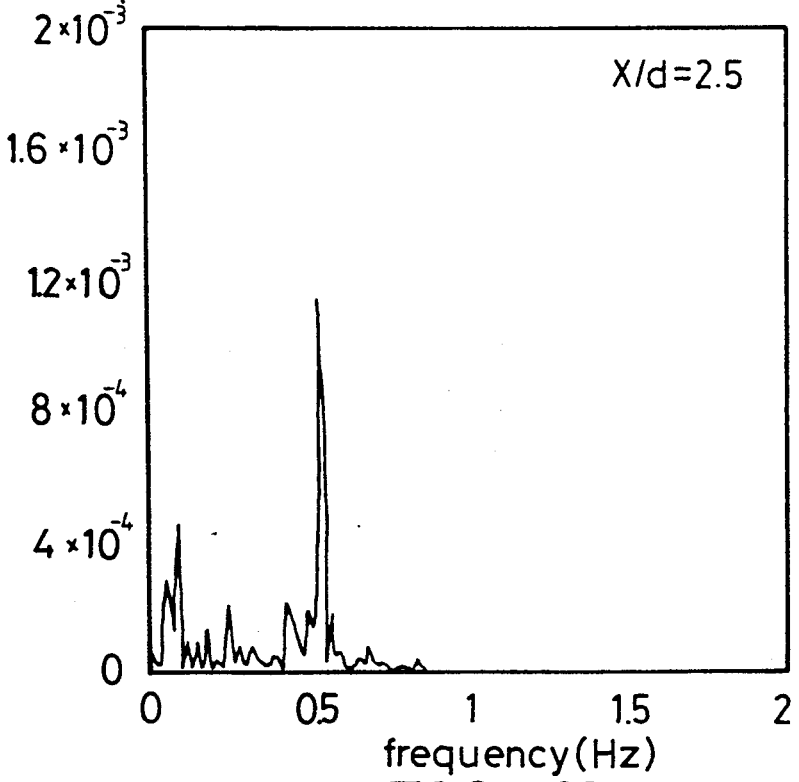
FIG. 6F shows the frequency spectra of wall pressure fluctuation obtained for disk A, $Re_d^* = 1.1 \times 10^4$, at $X/d = 2.5$.
Figure 6G:
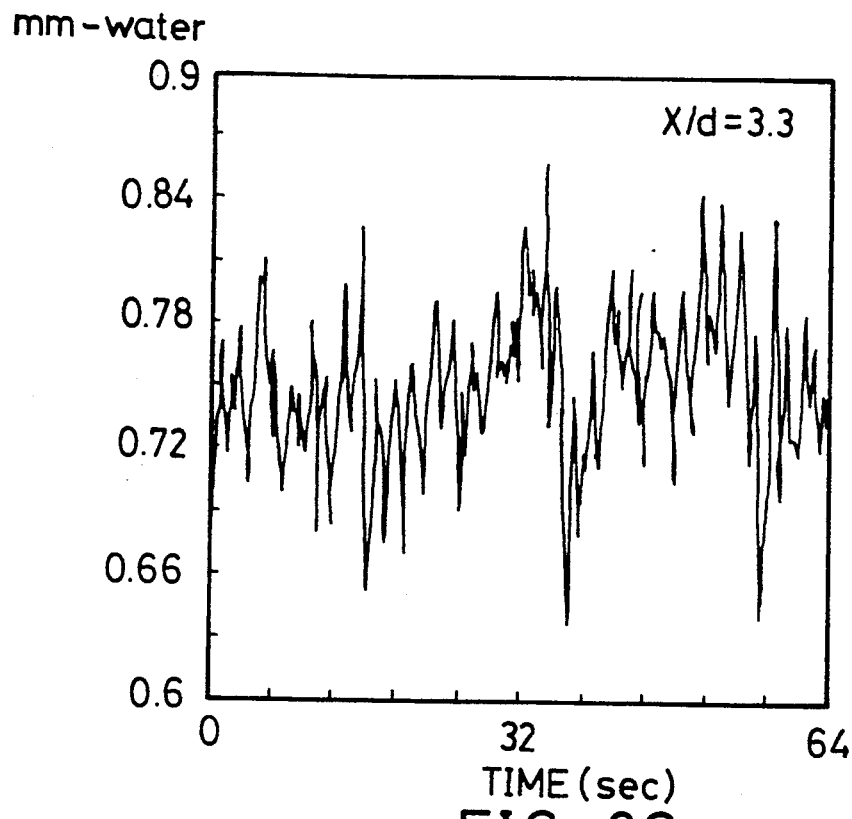
FIG. 6G shows the raw pressure signal obtained for disk A, $Re_d^* = 1.1 \times 10^4$, at $X/d = 3.3$.
Figure 6H:
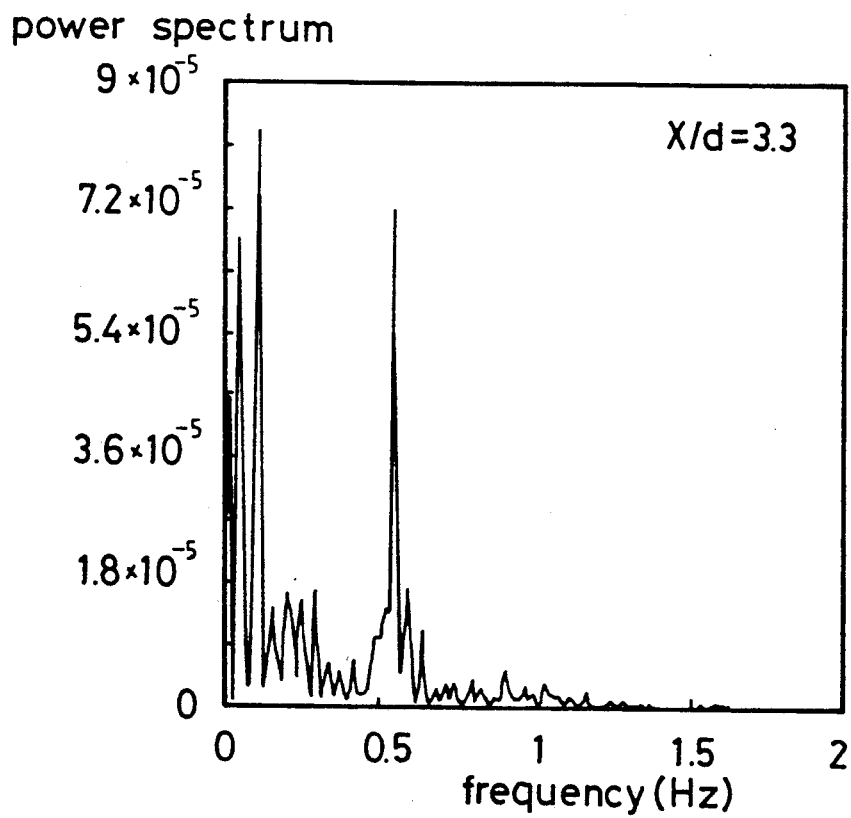
FIG. 6H shows the frequency spectra of wall pressure fluctuation obtained for disk A, $Re_d^* = 1.1 \times 10^4$, at $X/d = 3.3$.

The unsteady behavior of the wall pressure signal is shown in FIG. 5A by a segment of raw pressure signal obtained for disk B at X/d 2.14, downstream of the location where the maximum root-mean-square pressure fluctuation is measured. As seen, the signal trace mainly consists of variations of a low-frequency component whose time scale is of the order 6-7 s and a high-frequency component whose time scale is of the order 1 s. Laser-Doppler velocity measurements confirm that vortex shedding frequency of the wake coincides with the characteristic frequency associated with the variations of the higher-frequency component in the signal. Thus, variations of the lower-frequency component are suggested due to the deformation of the separation bubble. If one performs a spectral analysis of the signal one would find that energy resided in the component of vortex shedding frequency is relatively small, compared to that in the lower-frequency component. This presents a difficulty in identifying the vortex shedding frequency. However, if an appropriate high-pass filtering process is employed to the signal trace before performing spectral analysis, the situation is expected to improve greatly, see FIG. 5B for example.

To minimize the usage of the filtering technique, one alternately searches for a location where the pressure fluctuations measured are dominated by the vortex shedding frequency component. FIGS. 6A-6H compares the frequency spectra obtained for disk A at X/d = -0.15, 1.2, 2.5, and 3.3, when $Re_d^* = 1.1 \times 10^4$. The raw signals associated with these spectra are also included in the figure for reference. It is known in advance from LDV measurements that the vortex shedding frequency under this flow condition is 0.55 Hz. Among the four spectra shown in this figure, the one obtained at X/d = 1.2 shows the least favorable situation that the components of lower frequencies dominate. Coincidentally, X/d = 1.2 is about the location where the minimum mean pressure is measured, see FIG. 4. The frequency spectrum obtained at X/d 2.5 shows the most favorable situation that the vortex shedding frequency component appears to be a predominant peak. Moreover, the energy resided in this frequency component is about an order of magnitude higher than that of the same frequency component seen in the spectrum obtained at X/d = 3.3. The position X/d is noted to be slightly downstream of the location where the maximum wall pressure fluctuation is measured. It is also interesting to point out that at X/d −0.15 while the energy resided in the vortex shedding frequency component is low, this component is apparently dominant in the spectrum. This is attributed to the reason that the wake resulted behind the circular disk affects the flow pattern upstream.

It is concluded from this study that pressure fluctuations obtained on the wall contain desirable information of vortex shedding frequency associated with the wake resulting behind a confined circular disk. Vortex shedding frequency can be extracted from wall pressure signal through a high-pass filtering process or can be identified directly from frequency spectrum of raw signal if the signal is obtained in the neighborhood of the maximum pressure fluctuation being measured. This suggests a possibility to design a vortex flowmeter with an axisymmetric bluff body while vortex shedding frequency is obtained from wall pressure measurement.

What is claimed is:

1. A vortex shedder disposed in a conduit facing an incoming flow, comprising:

an axisymmetric bluff body comprising a circular disk facing said incoming flow, said disk having a sharp edge bevelled at an angle less than 90°, wherein said bluff body has a blockage ratio less than 29.2%; and support means for supporting said disk in said conduit such that a wake produced by said support means is negligible in comparison to a wake produced by said disk.

2. A method for detecting a mean velocity of an incoming flow in a conduit, comprising:

preparing an axisymmetric bluff body having a circular disk facing incoming flow, said disk having a sharp edge bevelled at an angle less than 90° and said disk having a blockage ratio less than 29.2%;

supporting said bluff body in a conduit such that a substantial wake is produced by said disk;

obtaining a vortex shedding frequency of said substantial wake; and obtaining the mean velocity from a relationship between said vortex shedding frequency and the mean velocity of the incoming flow.

3. The method for detecting a mean velocity of an incoming flow in a conduit as claimed in claim 2, further comprising:

recording a fluctuating wall pressure signal of said substantial wake, wherein said vortex shedding frequency is obtained from said wall fluctuating wall pressure signal.

4. The method for detecting a mean velocity of an incoming flow in a conduit as claimed in claim 3, wherein:

said step of obtaining said vortex shedding frequency is performed by spectral analysis.

5. The method for detecting a mean velocity of an incoming flow in a conduit as claimed in claim 3, wherein said step of obtaining said vortex shedding frequency is performed by filtering.

6. The method for detecting a mean velocity of an incoming flow in a conduit as claimed in claim 3, wherein:

said wall pressure fluctuating signal is recorded at a position downstream from said bluff body by a distance about 2.5 times as long as the diameter of said disk.

* * * * *